United States Patent
Meissner et al.

(10) Patent No.: US 8,709,131 B2
(45) Date of Patent: Apr. 29, 2014

(54) METHOD AND SYSTEM FOR THE PRODUCTION OF DIRECT REDUCED IRON USING A SYNTHESIS GAS WITH A HIGH CARBON MONOXIDE CONTENT

(75) Inventors: David C. Meissner, Charlotte, NC (US); Gary E. Metius, Charlotte, NC (US); Gregory D. Hughes, Charlotte, NC (US)

(73) Assignee: Midrex Technologies, Inc., Charlotte, NC (US)

( * ) Notice: Subject to any disclaimer, the term of this patent is extended or adjusted under 35 U.S.C. 154(b) by 189 days.

(21) Appl. No.: 13/397,421

(22) Filed: Feb. 15, 2012

(65) Prior Publication Data

US 2013/0205951 A1    Aug. 15, 2013

(51) Int. Cl.
*C21B 3/04*      (2006.01)
*F27D 99/00*     (2010.01)
*F27B 17/00*     (2006.01)

(52) U.S. Cl.
USPC .................... 75/488; 75/496; 75/497; 75/498

(58) Field of Classification Search
USPC ............................................ 75/488, 496–498
See application file for complete search history.

(56) References Cited

U.S. PATENT DOCUMENTS

| | | | |
|---|---|---|---|
| 3,844,766 A * | 10/1974 | Beggs | 75/490 |
| 4,108,636 A * | 8/1978 | Lange | 75/498 |
| 4,275,044 A * | 6/1981 | Kamody | 423/243.03 |
| 4,363,654 A * | 12/1982 | Frederick et al. | 75/493 |
| 4,756,750 A | 7/1988 | Bixler et al. | |
| 5,676,732 A | 10/1997 | Viramontes-Brown et al. | |
| 5,882,579 A * | 3/1999 | Viramontes-Brown et al. | 266/144 |
| 6,149,859 A | 11/2000 | Jahnke et al. | |
| 2007/0238906 A1 | 10/2007 | Brown et al. | |
| 2007/0245855 A1 | 10/2007 | Zendejas-Martinez | |
| 2010/0162852 A1 | 7/2010 | Becerra-Novoa et al. | |
| 2011/0247457 A1 | 10/2011 | Knop et al. | |

FOREIGN PATENT DOCUMENTS

WO    WO2009037587 A2    3/2009

* cited by examiner

*Primary Examiner* — George Wyszomierski
*Assistant Examiner* — Tima M McGurthry Banks
(74) *Attorney, Agent, or Firm* — Clements Bernard PLLC; Christopher L. Bernard; Lawrence A. Baratta, Jr.

(57) ABSTRACT

Methods and systems for the production of direct reduced iron, including: removing a top gas from a direct reduction furnace; carbon monoxide shifting the top gas using a carbon monoxide shift reactor to form a carbon monoxide shifted top gas having a reduced carbon monoxide content; adding one of a coal gas, a synthesis gas, and an export gas to at least a portion of the carbon monoxide shifted top gas to form a combined gas; removing carbon dioxide from the combined gas using a carbon dioxide removal unit to form a carbon dioxide lean combined gas; and providing the carbon dioxide lean combined gas to the direct reduction furnace as a reducing gas for producing direct reduced iron after heating to reduction temperature. Optionally, the method includes removing carbon dioxide from the top gas using a carbon dioxide removal unit prior to carbon monoxide shifting the top gas.

10 Claims, 1 Drawing Sheet

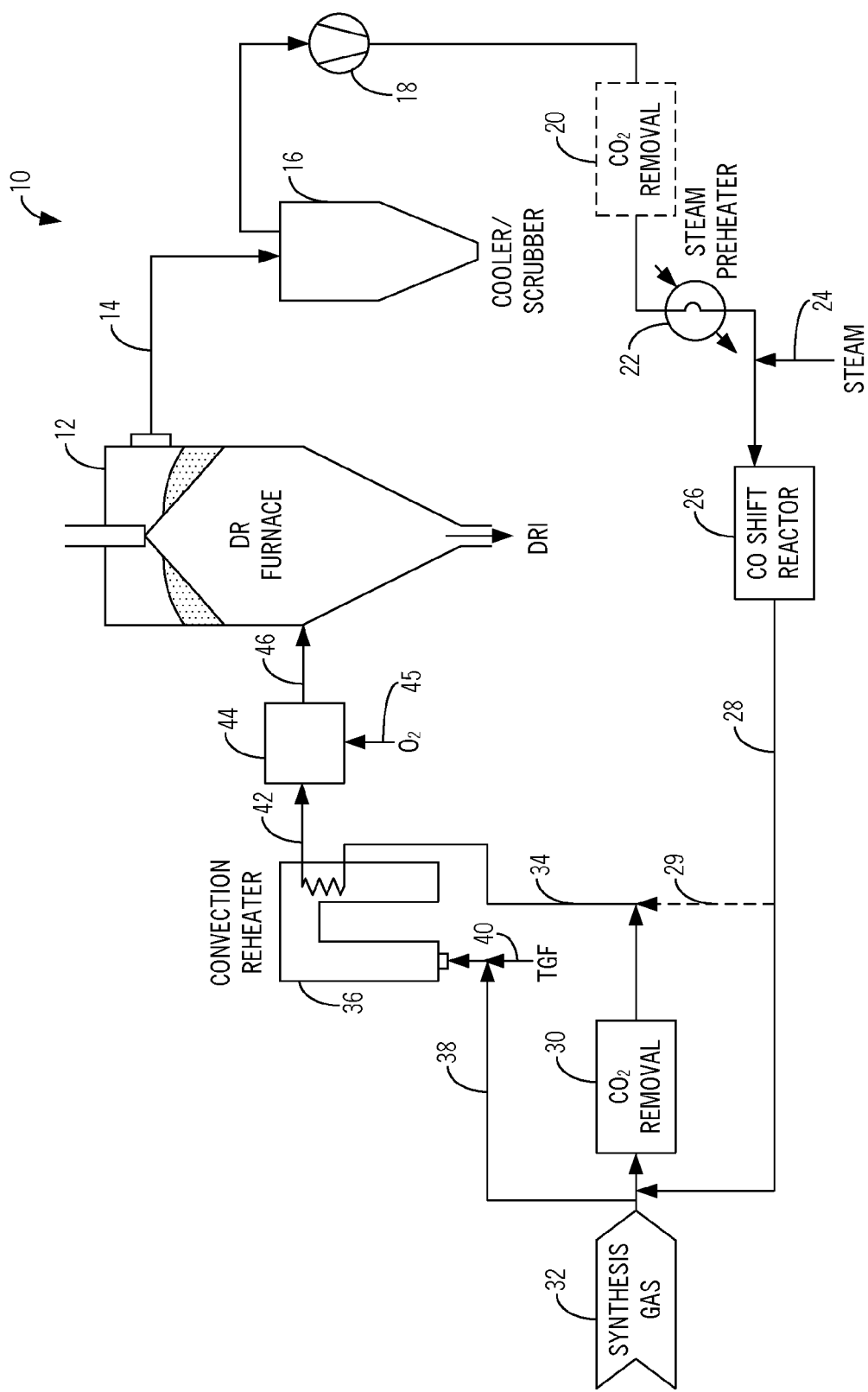

METHOD AND SYSTEM FOR THE PRODUCTION OF DIRECT REDUCED IRON USING A SYNTHESIS GAS WITH A HIGH CARBON MONOXIDE CONTENT

FIELD OF THE INVENTION

The present invention relates generally to methods and systems for the production of direct reduced iron (DRI). More specifically, the present invention relates to methods and systems for the production of DRI using a synthesis (syn) gas with a high carbon monoxide (CO) content.

BACKGROUND OF THE INVENTION

Syn gas generated from coal gasification processes or the like contains large amounts of CO, moderate amounts of hydrogen ($H_2$), plus oxidants, such as water vapor ($H_2O$) and carbon dioxide ($CO_2$). The oxidant levels may vary, depending upon the processes used to generate the syn gas. For example, if a melter-gasifier is used to generate the syn gas, whereby molten iron is produced as a product or by-product, an intermediate product of the pre-reduced iron is made using the melter gases and fed back to the melter, and off gases from the pre-reduction unit are exported for further use, the $CO_2$ content may be quite high (>25%). This syn gas may have a CO content of >40% and a $H_2$ content of about 15%. In order to use this syn gas for direct reduction (DR), the $H_2/CO$ ratio should be near 1.0 and the $CO_2$ less than about 5%.

Coal gas or syn gas with about 54% CO, 30% $H_2$, and 11% $CO_2$ has been used. This syn gas has been added to a recirculated top gas from the DR furnace, with subsequent $CO_2$ removal, humidification, heating to near reduction temperature, and reacting or shifting ($CO+H_2O<=>CO_2+H_2$) in a reactor immediately upstream of the DR furnace. A reducing gas with about 43% $H_2$ and 41% CO, for a $H_2/CO$ ratio of about 1.05 results, which is suitable for the DR of iron. Disadvantageously, all of the reducing gas has to flow through the shift reactor, requiring a relatively large shift reactor. The high shift reactor temperatures required (about 800 degrees C.) also significantly increase equipment cost.

Other methods and systems shift a high-CO content export gas directly from a melter-gasifier, before using the gas in a DR plant circuit. The export gas is shifted in one or two reactors before $CO_2$ is removed. Recirculated top gas from the DR furnace is added to the shifted export gas prior to $CO_2$ removal, or it may be added after $CO_2$ removal. With these methods and systems, it is desirable to have a gas composition after $CO_2$ removal with a $H_2/CO$ ratio of between about 2/1 and 20/1. The first stage shift reactor operates at about 490 degrees C., and the second stage shift reactor operates at between about 360 and 390 degrees C.

Further methods and systems teach similar processes, with the addition that $CO_2$-laden tail gas from the $CO_2$ removal unit is used as fuel for generating the steam required by the shift reactor. The shift reactor is used directly on the export gas from the melter-gasifier.

BRIEF SUMMARY OF THE INVENTION

In various exemplary embodiments, the present invention provides improved methods and systems for the production of DRI using coal gas or syn gas with a high CO content. The resulting reducing gas has a $H_2/CO$ ratio of about 1.0 as it enters the DR furnace. Advantageously, the size of the shift reactor used is minimized, resulting in lower equipment and catalyst costs. This is achieved by minimizing the amount of gas flow that must be shifted to effect the desired $H_2/CO$ ratio at the DR furnace.

Top gas or recirculated gas from the DR furnace is shifted, resulting in a lower flow to the shift reactor than is associated with existing methods and systems. This lower flow allows all of the above objectives to be achieved. Process analysis indicates that the volume of gas shifted using the top gas or recirculated gas may be only about 60-90% of the shifted gas flow when shifting the fresh syn gas, for example, depending upon the nitrogen content of the syn gas. This translates to a meaningful reduction in shift reactor size and cost, as well as catalyst volume and cost.

In one exemplary embodiment, the present invention provides a method for the production of direct reduced iron, including: removing a top gas from a direct reduction furnace; carbon monoxide shifting the top gas using a carbon monoxide shift reactor to form a carbon monoxide shifted top gas having a reduced carbon monoxide content; and providing the carbon monoxide shifted top gas to the direct reduction furnace as a reducing gas for producing direct reduced iron. The method also includes cooling and cleaning the top gas using a cooler/scrubber prior to carbon monoxide shifting the top gas. The method further includes compressing the top gas using a compressor prior to carbon monoxide shifting the top gas. Optionally, the method includes removing carbon dioxide from the top gas using a carbon dioxide removal unit prior to carbon monoxide shifting the top gas. The method still further includes preheating the top gas using a steam preheater prior to carbon monoxide shifting the top gas. The method still further includes adding steam to the top gas prior to carbon monoxide shifting the top gas. The method still further includes removing carbon dioxide from at least a portion of the top gas using a carbon dioxide removal unit subsequent to carbon monoxide shifting the top gas. The method still further includes adding one of a coal gas, a synthesis gas, and an export gas to at least a portion of the top gas subsequent to carbon monoxide shifting the top gas. The method still further includes heating the top gas using a reducing gas heater subsequent to carbon monoxide shifting the top gas. Finally, the method includes adding oxygen to the top gas for additional heating subsequent to carbon monoxide shifting the top gas.

In another exemplary embodiment, the present invention provides a method for the production of direct reduced iron, including: removing a top gas from a direct reduction furnace; carbon monoxide shifting the top gas using a carbon monoxide shift reactor to form a carbon monoxide shifted top gas having a reduced carbon monoxide content; adding one of a coal gas, a synthesis gas, and an export gas to at least a portion of the carbon monoxide shifted top gas to form a combined gas; removing carbon dioxide from the combined gas using a carbon dioxide removal unit to form a carbon dioxide lean combined gas; and providing the carbon dioxide lean combined gas to the direct reduction furnace as a reducing gas for producing direct reduced iron after heating to reduction temperature. Optionally, the method includes removing carbon dioxide from the top gas using a carbon dioxide removal unit prior to carbon monoxide shifting the top gas.

In a further exemplary embodiment, the present invention provides a system for the production of direct reduced iron, including: a direct reduction furnace for receiving iron oxide, exposing the iron oxide to a reducing gas, and thereby reducing the iron oxide to reduced metallic iron, wherein the direct reduction furnace generates a top gas; and a carbon monoxide shift reactor in fluid communication with the direct reduction furnace for carbon monoxide shifting the top gas to form a carbon monoxide shifted top gas having a reduced carbon monoxide content; wherein the carbon monoxide shifted top gas is recycled to the direct reduction furnace as at least a portion of the reducing gas for producing the reduced metallic iron. The system also includes a cooler/scrubber for cooling and cleaning the top gas prior to carbon monoxide shifting the top gas. The system further includes a compressor for compressing the top gas prior to carbon monoxide shifting the top gas. Optionally, the system includes a carbon dioxide removal unit for removing carbon dioxide from the top gas prior to carbon monoxide shifting the top gas. The system still further includes a steam preheater for preheating the top gas prior to carbon monoxide shifting the top gas. The system still further includes a steam source for adding steam to the top gas prior to carbon monoxide shifting the top gas. The system still further includes a carbon dioxide removal unit for removing carbon dioxide from at least a portion of the top gas subsequent to carbon monoxide shifting the top gas. The system still further includes an external gas source for adding one of a coal gas, a synthesis gas, and an export gas to at least a portion of the top gas subsequent to carbon monoxide shifting the top gas. The system still further includes a reducing gas heater for heating the top gas subsequent to carbon monoxide shifting the top gas. Finally, the system includes an oxygen source for adding oxygen to the top gas for additional heating subsequent to carbon monoxide shifting the top gas.

BRIEF DESCRIPTION OF THE DRAWINGS

The present invention is illustrated and described herein with reference to the various drawings, in which like reference numbers are used to denote like method steps/system components, as appropriate, and in which:

FIG. 1 is a schematic diagram illustrating one exemplary embodiment of the method and system for the production of DRI using a coal gas or syn gas with a high CO content of the present invention.

DETAILED DESCRIPTION OF THE INVENTION

Referring to FIG. 1, in one exemplary embodiment of the present invention, the method and system 10 for the production of DRI using a coal gas or syn gas with a high CO content includes a DR furnace 12, such as a Midrex® DR shaft furnace or the like, well known to those of ordinary skill in the art, in which iron oxide pellets, lumps, and/or agglomerates are reduced using a countercurrent flow of reducing gas, consisting primarily of CO and $H_2$. This reducing gas may be made from natural gas or other gaseous fuels, solid fuels, such as coal, liquid fuels, such as heavy fuel oil, or other export gases. The DRI descends as a moving packed bed through the DR furnace 12 by gravity. The DR furnace 12 has a converging discharge section through which the DRI is continually discharged.

Top gas 14 exits the DR furnace 12 near the top of the DR furnace 12 and is communicated to a cooler/scrubber 16 that cools and cleans the top gas, prior to compression by a compressor 18.

Optionally, the cooled, cleaned, and compressed top gas 14 is next communicated to a $CO_2$ removal unit 20 that removes undesirable $CO_2$ from the stream. The $CO_2$ removal unit 20 may be a chemical-type $CO_2$ removal unit, such as a monoethanolamine (MEA) or hot potassium carbonate $CO_2$ removal unit, or it may be a molecular sieve-type $CO_2$ removal unit, such as a pressure swing adsorption (PSA) or vacuum pressure swing adsorption (VPSA) $CO_2$ removal unit.

The treated top gas 14 is next preheated in a steam preheater 22 or the like, and steam 24 is added to aide in the CO shift reaction. In a CO shift reactor 26, CO in the treated top gas 14 is shifted with steam to produce more $H_2$ and $CO_2$, and less CO and $H_2O$, via the equation ($CO+H_2O<=>CO_2+H_2$). This process is well known to those of ordinary skill in the art, although its present positioning in the DR/top gas cycle is not well known to those of ordinary skill in the art.

The CO shifted top gas 28 is next communicated to a $CO_2$ removal unit 30, where coal gas, syn gas (Finex off gas or the like), or the like 32 is first mixed with the CO shifted top gas 28 prior to $CO_2$ removal. Again, the $CO_2$ removal unit 30 may be a chemical-type $CO_2$ removal unit, such as a MEA or hot potassium carbonate $CO_2$ removal unit, or it may be a molecular sieve-type $CO_2$ removal unit, such as a PSA or VPSA $CO_2$ removal unit. Optionally, a portion of the CO shifted top gas 28,29 is diverted prior to the $CO_2$ removal unit 30 and is mixed with the $CO_2$ lean stream subsequent to the $CO_2$ removal unit 30.

The CO shifted, $CO_2$ lean top gas/syn gas 34 is next communicated to a reducing gas heater 36, where the resulting stream is heated to about 600 degrees C. in a first stage consisting of an indirect-type heater or the like, and subsequently heated to between about 800 and 1,000 degrees C. in a second stage consisting of an oxygen injection-type heater 44 or the like. Optionally, a portion of the coal gas or syn gas 32,38 is diverted prior to the $CO_2$ removal unit 30 and used, alone or in combination with top gas fuel 40, to fire the reducing gas heater 36.

Optionally, oxygen 45 is then added to this heated, CO shifted, $CO_2$ lean top gas/syn gas 42 for additional heating and communicated to the DR furnace 12 as reducing gas 46. Again, in the DR furnace 12, iron oxide pellets, lumps, and/or agglomerates are reduced using a countercurrent flow of the reducing gas 46, consisting primarily of CO and $H_2$, but having an advantageous $H_2$/CO ratio of about 1.0. The DRI descends as a moving packed bed through the DR furnace 12 by gravity. The DR furnace 12 has a converging discharge section through which the DRI is continually discharged.

Again, the use of the first $CO_2$ removal unit 20 described above (before CO shifting) is optional. Using this $CO_2$ removal unit 20 requires the overall system 10 to have two $CO_2$ removal units 20 and 30, but does allow for an even smaller CO shift reactor 26, having to handle smaller stream volumes.

In general, the methods and systems 10 of the present invention are especially suited for high-pressure DR shaft furnace operation as, under such circumstances, large amounts of CO, addressed by the methods and systems 10 of the present invention, tend to cause carbon deposition problems and overheating in the DR furnace 12. In accordance with the methods and systems 10 of the present invention, the reducing gas 46 has lower CO content, carbon deposition is minimized at high pressures, for example, and overheating is avoided. Exemplary temperature and contents are between about 800 and 1,000 degrees C. with a $H_2$/CO ratio of about 1.0.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A method for the production of direct reduced iron, comprising:
   removing a top gas from a direct reduction furnace;
   carbon monoxide shifting the top gas using a carbon monoxide shift reactor to form a carbon monoxide shifted top gas having a reduced carbon monoxide content;
   adding one of a coal gas, a synthesis gas, and an export gas to at least a portion of the carbon monoxide shifted top gas to form a combined gas;
   removing carbon dioxide from the combined gas using a carbon dioxide removal unit to form a carbon dioxide lean combined gas; and
   providing the carbon dioxide lean combined gas to the direct reduction furnace as a reducing gas for producing direct reduced iron.

2. The method of claim 1, further comprising cooling and cleaning the top gas using a cooler/scrubber prior to carbon monoxide shifting the top gas.

3. The method of claim 1, further comprising compressing the top gas using a compressor prior to carbon monoxide shifting the top gas.

4. The method of claim 1, further comprising removing carbon dioxide from the top gas using a carbon dioxide removal unit prior to carbon monoxide shifting the top gas.

5. The method of claim 1, further comprising preheating the top gas using a steam preheater prior to carbon monoxide shifting the top gas.

6. The method of claim 1, further comprising adding steam to the top gas prior to carbon monoxide shifting the top gas.

7. The method of claim 1, further comprising heating the carbon dioxide lean combined gas using a reducing gas heater.

8. The method of claim 1, further comprising adding oxygen to the carbon dioxide lean combined gas for additional heating.

9. A method for the production of direct reduced iron, comprising:
   removing a top gas from a direct reduction furnace;
   carbon monoxide shifting the top gas using a carbon monoxide shift reactor to form a carbon monoxide shifted top gas having a reduced carbon monoxide content;
   adding one of a coal gas, a synthesis gas, and an export gas to at least a portion of the carbon monoxide shifted top gas to form a combined gas;
   removing carbon dioxide from the combined gas using a carbon dioxide removal unit to form a carbon dioxide lean combined gas; and
   providing the carbon dioxide lean combined gas to the direct reduction furnace as a reducing gas for producing direct reduced iron after heating to reduction temperature.

10. The method of claim 9, further comprising removing carbon dioxide from the top gas using a carbon dioxide removal unit prior to carbon monoxide shifting the top gas.

* * * * *